United States Patent
Wang et al.

(10) Patent No.: US 8,868,009 B2
(45) Date of Patent: Oct. 21, 2014

(54) METHOD AND SYSTEM FOR MULTI-BEAM FORMING BASED ON JOINT TRANSCEIVER INFORMATION

(75) Inventors: Yanwen Wang, Guangdong Province (CN); Wenhao Liu, Guangdong Province (CN); Yan Li, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 402 days.

(21) Appl. No.: 13/258,069

(22) PCT Filed: Jun. 30, 2010

(86) PCT No.: PCT/CN2010/074870
§ 371 (c)(1),
(2), (4) Date: Sep. 21, 2011

(87) PCT Pub. No.: WO2011/032421
PCT Pub. Date: Mar. 24, 2011

(65) Prior Publication Data
US 2012/0164951 A1 Jun. 28, 2012

(30) Foreign Application Priority Data
Sep. 17, 2009 (CN) .......................... 2009 1 0169495

(51) Int. Cl.
*H04B 1/02* (2006.01)
*H04B 7/02* (2006.01)
*H04B 7/06* (2006.01)
*H04B 7/04* (2006.01)

(52) U.S. Cl.
CPC ............ *H04B 7/0617* (2013.01); *H04B 7/0443* (2013.01)
USPC ........... 455/101; 455/91; 455/13.3; 455/63.4; 455/69; 375/146; 375/267; 370/334

(58) Field of Classification Search
CPC ...... H04B 7/0617; H04B 7/0417; H04B 7/04; H04B 7/0634; H04B 7/0639; H04B 7/066; H04B 7/0663; H04L 25/03343; H04L 1/0631; H04L 2025/03426; H04L 2025/03808
USPC ............ 455/91, 13.3, 39, 63.4, 69, 101, 338, 455/550.1; 375/146, 267, 295, 299; 370/328, 334
See application file for complete search history.

(56) References Cited

U.S. PATENT DOCUMENTS

2007/0160011 A1* 7/2007 Kim et al. ...................... 370/332
2008/0112504 A1* 5/2008 Jiang et al. .................... 375/296
(Continued)

OTHER PUBLICATIONS

Jiang, Yi et al. Joint Transceiver Design for MIMO Communications Using Geometric Mean Decomposition. IEEE Transactions on signal processing, Oct. 2005.
(Continued)

*Primary Examiner* — Shaima Q Aminzay
(74) *Attorney, Agent, or Firm* — Ling Wu; Stephen Yang; Ling and Yang Intellectual Property (57) ABSTRACT

A method for multi-beam forming based on joint receiving and transmitting end information is provided. The method includes: a transmitting end decomposing a channel matrix H using a geometric mean decomposition (GMD) way to obtain a unitary matrix P; the transmitting end using the unitary matrix P as a weight matrix of GMD beam forming and executing multi-beam forming processing on an original transmission signal x. The present invention also provides a system for multi-beam forming based on joint receiving and transmitting end information, and a transmitting device and receiving device for supporting multi-beam forming based on joint receiving and transmitting end information. By using geometric mean decomposition way to decompose the channel matrix H, the sub channels corresponding to various beams obtain the equal gain. When the channel is ill-conditioned, the channel equalization will not interfere with searching the perturbation vector, thereby avoiding the performance degradation.

8 Claims, 2 Drawing Sheets

(56) References Cited

U.S. PATENT DOCUMENTS

2008/0192704 A1\* 8/2008 Kent et al. .................. 370/335
2009/0003485 A1\* 1/2009 Li et al. ...................... 375/299
2009/0195453 A1\* 8/2009 Kim ............................ 342/373
2009/0213966 A1 8/2009 Teo et al.

OTHER PUBLICATIONS

International Search Report for PCT/CN2010/074870 dated Sep. 1, 2010.

\* cited by examiner

METHOD AND SYSTEM FOR MULTI-BEAM FORMING BASED ON JOINT TRANSCEIVER INFORMATION

TECHNICAL FIELD

The present invention relates to the field of the communication technique, and more especially, to a method and a system for multi-beam forming based on joint receiving and transmitting end information.

BACKGROUND OF THE RELATED ART

In the 3rd Generation Partnership Project Long-Term Evolution (3GPP LTE) system, both uplink and downlink apply the Multiple Input Multiple Output (MIMO) way. The MIMO system can increase the channel capacity over a plurality of times and has very high spectrum utilization efficiency. However, compared with the Single Input Single Output (SISO) system, the MIMO system might cause the Co-Channel Interference (CCI). The typical techniques for eliminating the CCI include beam forming or pre-encoding at the transmitting end, multi-user detecting at the receiving end, or the joint design of the receiving and the transmitting ends. Since the multi-user detecting at the receiving end is easy to be affected by the error spread, thus using the beam forming or pre-encoding at the transmitting end to eliminate the CCI is more beneficial to the performance.

At present, the joint receiving and the transmitting research based on the channel information known by both the transmitting end and the receiving end is widely focused, for example, the Singular Value Decomposition (SVD) beam forming algorithm. The SVD beam forming algorithm can decompose a MIMO channel into multiple parallel independent SISO sub channels. In the condition that the total transmission power is fixed, using the water-filling algorithm to allocate power can achieve the maximum channel capacity.

SUMMARY OF THE INVENTION

In the prior art, since the channel gains of the sub channels corresponding to various beams are different, the channel gains of a plurality of sub channels might be low, thereby leading to a large bit error rate (BER). It can be seen that the existing two angular decomposition methods (for example SVD) will decompose the MIMO channel into multiple two angular channels with different diagonal elements, so that various channels have different gains. When one channel is ill-conditioned, the non-equalization of this channel will interfere with searching the perturbation vector, thereby resulting in performance degradation.

In order to solve the problem of performance degradation caused by the interference in searching the perturbation vector when the channel corresponding to each beam is ill-conditioned if applying the existing two angular decomposition method,
an example of the present invention provides a method for multi-beam forming based on joint receiving and transmitting end information, and the method comprises:

a transmitting end executing geometric mean decomposition (GMD) on a channel matrix H to decompose to obtain a unitary matrix P; and the transmitting end taking the unitary matrix P as a weight matrix of GMD beam forming, and executing multi-beam forming processing on an original transmission signal x.

Meanwhile, an example of the present invention also provides a device for multi-beam forming based on joint receiving and transmitting end information, and the device comprises:

a geometric mean decomposition module, which is configured to: execute geometric mean decomposition (GMD) on a channel matrix H to decompose to obtain a unitary matrix P; and a beam forming processing module, which is configured to: take the unitary matrix P as a weight matrix of GMD beam forming, and execute multi-beam forming processing on an original transmission signal x.

An example of the present invention also provides a transmitting device for supporting multi-beam forming based on joint receiving and transmitting end information, which comprises:

a geometric mean decomposition module, which is configured to: execute geometric mean decomposition (GMD) on a channel matrix H to decompose to obtain a unitary matrix P;

a beam forming processing module, which is configured to: take the unitary matrix P as a weight matrix of GMD beam forming, and execute multi-beam forming processing on an original transmission signal x; and a transmitting module, which is configured to: transmit a beam formed transmission signal via the channel matrix H.

An example of the present invention also provides a receiving device for supporting multi-beam forming based on joint receiving and transmitting end information, which comprises:

a receiving module, which is configured to: receive a signal r, $r = H \cdot W_{GMD} \cdot x + n$, where n is a noise; wherein H is a channel matrix, x is an original transmission signal, $W_{GMD}$ is a transmission weight, $W_{GMD}=P$; P is a unitary matrix, geometric mean decomposition is executed on the channel matrix H: $H=QRP^{-1}$, where Q is the unitary matrix; a superscript $-1$ is a conjugate transpose operator, that is, satisfying $Q^{-1}Q=P^{-1}P=I_{K_1,K_2}$, where I is a unit matrix, the subscripts $K_1$ and $K_2$ respectively denote numbers of rows and columns of a matrix, $K_1=K_2=K$, where K is a rank of the channel matrix H, R is an upper triangular matrix with same diagonal elements, and the diagonal elements of the upper triangular matrix are:

$$a_{ii} = \bar{\lambda} = \left( \prod_{i=1}^{K} \lambda_i \right)^{1/K},$$

$\lambda_1 \geq \lambda_2 \geq \ldots \geq \lambda_K \geq 0$, $\lambda_i$ is a nonzero eigenvalue of a correlation matrix $HH^{-1}$, i is an integer, and $1 \leq i \leq K$;

an equalization processing module, which is configured to: use a unitary matrix $Q^{-1}$ to equalize the received signal r to acquire an equalized received signal $$\tilde{r} = \begin{bmatrix} \tilde{r}_1 \\ \vdots \\ \tilde{r}_i \\ \vdots \\ \tilde{r}_K \end{bmatrix}, \begin{bmatrix} \tilde{r}_1 \\ \vdots \\ \tilde{r}_i \\ \vdots \\ \tilde{r}_K \end{bmatrix}$$

is an equalized received signal sequence, decompose H into K identical sub channels, and the equalized received signal on each sub-channel is $$\tilde{r}_i = \overline{\lambda} x_i + \sum_{j>i}^{K} a_{ij} x_j + \tilde{n}_i,$$

where j is an integer, 1≤j≤K, $a_{ij}$ is an element in the upper triangular matrix of the geometric mean decomposition, $x_i$ is an $i^{th}$ original transmission signal in the original transmission signal sequence, $x_j$ is a $j^{th}$ original transmission signal in the original transmission signal sequence, and $\tilde{n}_i$ is an $i^{th}$ noise in a noise sequence after equalization processing; and a signal recovering module, which is configured to: recover the transmission signal x according to the equalized received signal.

From the above specific implementation scheme provided in the present invention, it can be seen that the present invention executes the geometric mean decomposition on the channel matrix H to make the sub channels corresponding to various beams obtain the equal gain, and when the channel is an ill-conditioned channel, this channel equalization will not interfere with searching the perturbation vector, so as to avoid performance degradation.

PREFERRED EMBODIMENTS OF THE PRESENT INVENTION

In order to solve the problem, the first example of the present invention provides a method for multi-beam forming based on joint receiving and transmitting end information, the transmitting end executes the Geometric Mean Decomposition (GMD) on the channel matrix H to decompose to obtain a unitary matrix P, the transmitting end takes the unitary matrix P as the weight matrix of GMD beam forming to execute multi-beam forming processing on the original transmission signal x. The present invention applies the geometric mean decomposition way, which can decompose a MIMO channel matrix into multiple two angular channels with the same diagonal element values, and all the diagonal element values are equal to the geometric mean value of the channel matrix eigenvalues, so as to make the sub channels obtain the equal gain. When the channel is ill-conditioned, the equalization of the channel will not interfere with searching the perturbation vector, thereby avoiding performance degradation.

Figure 1:
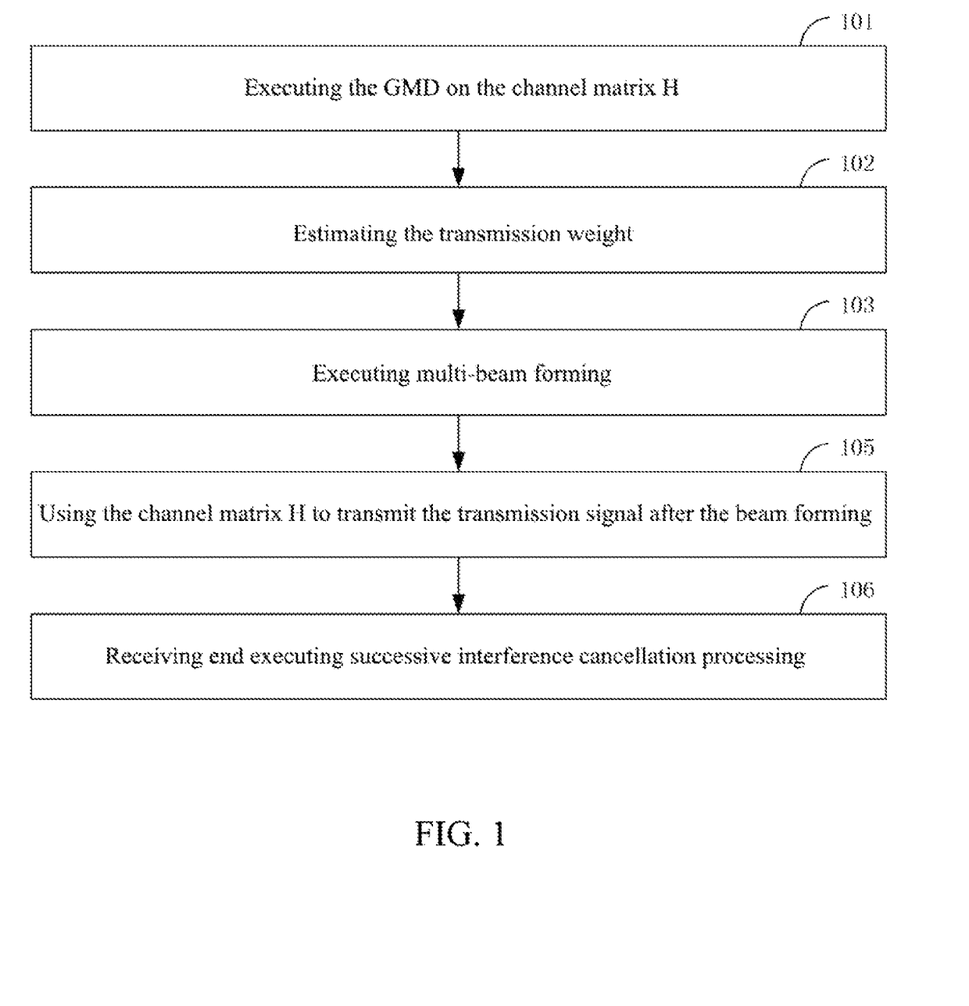
FIG. 1 is a flow chart of the method according to the first example provided in the present invention.

As shown in FIG. 1, the method for multi-beam forming based on joint receiving and transmitting end information comprises:

step 101: in the case that the channel information is known at the transmitting end, GMD is executed on the channel matrix H: $H=QRP^{-1}$, where Q and P are unitary matrixes, the superscript −1 is the conjugate transpose operator, that is, it satisfies the $Q^{-1}Q=P^{-1}P=I_{K_1,K_2}$, where I is the unit matrix, the subscripts $K_1$ and $K_2$ respectively denote the numbers of rows and columns of the matrix, $K_1=K_2=K$, where K is the rank of the channel matrix H, that is K=rank(H), R is a real upper triangular matrix with the same diagonal elements, and its diagonal elements are:

$$a_{ii} = \overline{\lambda} = \left( \prod_{i=1}^{K} \lambda_i \right)^{1/K},$$

$\lambda_1 \le \lambda_2 \le \ldots \le \lambda_K \le 0$, $\lambda_i$ is a nonzero eigenvalue of the correlation matrix $HH^{-1}$, is an integer, and 1≤i≤K; since all diagonal elements are equal to the geometric mean value of the eigenvalues of H, thus the decomposition can obtain sub channels with the equal gain.

Step 102: the transmission weight $W_{GMD}$ is estimated; comprising:

in order to separate multi-path signals at the receiving end, P is selected as the weight matrix of the GMD beam forming, namely: $W_{GMD}=P$. Since the weight matrix P at the transmitting end is a unitary matrix, it does not reduce the efficiency of transmission power.

Step 103: multi-beam forming is executed; comprising:

beam forming processing is executed on the original transmission signal x according to the estimated transmission weight $W_{GMD}$ to obtain the beam formed transmission signal $W_{GMD} \cdot x$, where $$x = \begin{bmatrix} x_1 \\ \vdots \\ x_i \\ \vdots \\ x_K \end{bmatrix}, \text{ and } \begin{bmatrix} x_1 \\ \vdots \\ x_i \\ \vdots \\ x_K \end{bmatrix}$$

is the original transmission signal sequence, $x_1$ is the first original transmission signal, $x_i$ is the $i^{th}$ original transmission signal, and $x_k$ is the $k^{th}$ original transmission signal.

Step 104: the channel matrix H is used to transmit the beam formed transmission signal $W_{GMD} \cdot x$, and the transmitted signal s is $s = H \cdot W_{GMD} \cdot x$.

Step 105: the receiving end executes successive interference cancellation processing;

the signal r received by the receiving end is: $r = H \cdot W_{GMD} \cdot x + n$; where n is the noise.

The receiving end equalizes the received signal r using the unitary matrix $Q^{-1}$, and since $Q^{-1}$ is a unitary matrix, it does not change the statistical characteristic of the noise n, the equalized received signal is $$\tilde{r} = \begin{bmatrix} \tilde{r}_1 \\ \vdots \\ \tilde{r}_i \\ \vdots \\ \tilde{r}_K \end{bmatrix}, \text{ and } \begin{bmatrix} \tilde{r}_1 \\ \vdots \\ \tilde{r}_i \\ \vdots \\ \tilde{r}_K \end{bmatrix}$$

is the equalized received signal sequence, where:

$$\begin{aligned} \tilde{r} &= Q^{-1} r \\ &= Q^{-1}(HPx + n) \\ &= Q^{-1}(QRx + n) \\ &= Rx + Q^{-1} n \\ &= Rx + \tilde{n} \end{aligned} \quad (1)$$

where $$\tilde{n} = \begin{bmatrix} \tilde{n}_1 \\ \vdots \\ \tilde{n}_i \\ \vdots \\ \tilde{n}_K \end{bmatrix}$$

is the noise after the equalization, and $$\begin{bmatrix} \tilde{n}_1 \\ \vdots \\ \tilde{n}_i \\ \vdots \\ \tilde{n}_K \end{bmatrix}$$

is the noise sequence after the equalization, and $$R = \begin{bmatrix} a_{11} & \cdots & a_{1i} & \cdots & a_{1K} \\ \vdots & & \vdots & & \vdots \\ 0 & \cdots & a_{ii} & \cdots & a_{iK} \\ \vdots & & \ddots & \ddots & \vdots \\ 0 & \cdots & 0 & \cdots & a_{KK} \end{bmatrix}$$

is an upper triangular matrix, and the last equation $\tilde{r}=Rx+\tilde{n}$ in formula (I) can be denoted with a matrix:

$$\begin{bmatrix} \tilde{r}_1 \\ \vdots \\ \tilde{r}_i \\ \vdots \\ \tilde{r}_K \end{bmatrix} = \begin{bmatrix} a_{11} & \cdots & a_{1i} & \cdots & a_{1K} \\ \vdots & & \vdots & & \vdots \\ 0 & \cdots & a_{ii} & \cdots & a_{iK} \\ \vdots & & \ddots & \ddots & \vdots \\ 0 & \cdots & 0 & \cdots & a_{KK} \end{bmatrix} \begin{bmatrix} x_1 \\ \vdots \\ x_i \\ \vdots \\ x_K \end{bmatrix} + \begin{bmatrix} \tilde{n}_1 \\ \vdots \\ \tilde{n}_i \\ \vdots \\ \tilde{n}_K \end{bmatrix} \quad (2)$$

where $a_{11} = \ldots = a_{ii} = \ldots = a_{KK} = \bar{\lambda}$, and thus the H can be decomposed into K identical sub channels:

$$\tilde{r}_i = \bar{\lambda} x_i + \sum_{j>i}^{K} a_{ij} x_j + \tilde{n}_i \quad (3)$$

$\tilde{r}_i$ is the $i^{th}$ received signal in the equalized received signal sequence, $a_{ij}$ is an element in the upper triangular matrix of the geometric mean decomposition, j is an integer, $1 \leq j \leq K$, $x_j$ is the $j^{th}$ original transmission signal in the original transmission signal sequence, $\tilde{n}_i$ is the $i^{th}$ noise in the noise sequence after the equalization processing, and thus the transmission signal $$x = \begin{bmatrix} x_1 \\ \vdots \\ x_i \\ \vdots \\ x_K \end{bmatrix}$$

can be recovered by using the successive interference cancellation technique c according to $\tilde{r}$. When applying the GMD beam forming algorithm, the signal to noise ratios of various sub channels are the same, thus the transmission powers of various signal are equal at the transmitting end.

Figure 2:
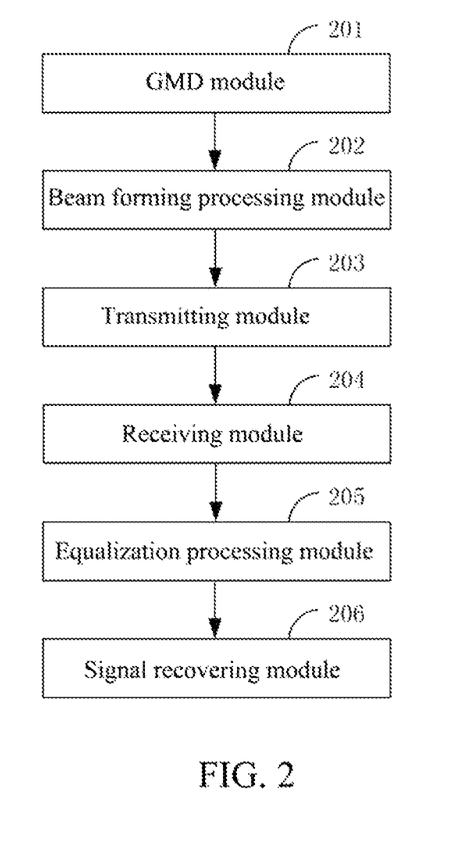
FIG. 2 is a diagram of the system structure according to the second example provided in the present invention.

The second example provided in the present invention is a system for multi-beam forming based on the joint receiving and transmitting end information, the system structure is shown in FIG. 2, and it comprises:

a geometric mean decomposition module 201, which is configured to: execute geometric mean decomposition on the channel matrix H to decompose to obtain the unitary matrix P; and a beam forming processing module 202, which is configured to: take the unitary matrix P as the weight matrix of GMD beam forming to execute multi-beam forming processing on the original transmission signal x.

Furthermore, the geometric mean decomposition module 201 is configured to execute GMD on the channel matrix H according to the following way: $H=QRP^{-1}$, where Q and P are unitary matrixes, the superscript −1 is the conjugate transpose operator, that is, it satisfies the $Q^{-1}Q=P^{-1}P=I_{K_1,K_2}$, where I is the unit matrix, the subscripts $K_1$ and $K_2$ respectively denote the numbers of rows and columns of the matrix, $K_1=K_2=K$, where K is the rank of the channel matrix H, that is K=rank (H), R is an upper triangular matrix with the same diagonal elements, and its diagonal elements are:

$$a_{ii} = \bar{\lambda} = \left( \prod_{i=1}^{K} \lambda_i \right)^{1/K},$$

$\lambda_1 \geq \lambda_2 \geq \ldots \geq \lambda_K \geq 0$, $\lambda_i$ is a nonzero eigenvalue of the correlation matrix $HH^{-1}$, i is an integer, and $1 \leq i \leq K$;

the beam forming processing module 202 is configured to execute multi-beam forming processing on the original transmission signal x according to the following way: taking the unitary matrix P as the weight matrix to estimate the transmission weight $W_{GMD}$, $W_{GMD}=P$, and executing multi-beam forming processing on the original transmission signal x according to the estimated transmission weight to obtain the beam formed transmission signal $W_{GMD} \cdot x$, where $$x = \begin{bmatrix} x_1 \\ \vdots \\ x_i \\ \vdots \\ x_K \end{bmatrix}, \text{ and } \begin{bmatrix} x_1 \\ \vdots \\ x_i \\ \vdots \\ x_K \end{bmatrix}$$

is the original transmission signal sequence.

The system also comprises:

a transmitting module 203, which is configured to: transmit the beam formed transmission signal $W_{GMD} \cdot x$ via the channel matrix H, wherein the transmitted signal s is: $s=H \cdot W_{GMD} \cdot x$.

The system also comprises:

a receiving module 204, which is configured to: receive the signal r, wherein r=H·$W_{GMD}$·x+n, where n is the noise;

a equalization processing module 205, which is configured to: use the unitary matrix $Q^{-1}$ to equalize the received signal r to acquire the equalized received signal $$\tilde{r} = \begin{bmatrix} \tilde{r}_1 \\ \vdots \\ \tilde{r}_i \\ \vdots \\ \tilde{r}_K \end{bmatrix}, \text{ where } \begin{bmatrix} \tilde{r}_1 \\ \vdots \\ \tilde{r}_i \\ \vdots \\ \tilde{r}_K \end{bmatrix}$$

is the equalized received signal sequence, and decompose H into K identical sub channels, where K is the rank of the channel matrix H, and the signal received on each sub channel after the equalization is $$\tilde{r}_i = \bar{\lambda} x_i + \sum_{j>i}^{K} a_{ij} x_j + \tilde{n}_i,$$

where j is an integer, $1 \le j \le K$, $a_{ij}$ is an element in the upper triangular matrix of the geometric mean decomposition, $x_i$ is the $i^{th}$ original transmission signal in the original transmission signal sequence, $x_j$ is the $j^{th}$ original transmission signal in the original transmission signal sequence, and $\tilde{n}_i$ is the $i^{th}$ noise in the noise sequence after the equalization processing; and a signal recovering module 206, which is configured to: recover the transmission signal x from the signal received after the equalization.

The signal recovering module 206 is configured to use the successive interference cancellation technique to recover the transmission signal $$x = \begin{bmatrix} x_1 \\ \vdots \\ x_i \\ \vdots \\ x_K \end{bmatrix}$$

according to the equalized received signal.

The example of the present invention also provides a transmitting device for supporting multi-beam forming based on the joint receiving and transmitting end information, and the transmitting device comprises:

a geometric mean decomposition module, which is configured to: execute Geometric Mean Decomposition (GMD) on the channel matrix H to decompose to obtain the unitary matrix P;

a beam forming processing module, which is configured to: take the unitary matrix P as the weight matrix of GMD beam forming to execute multi-beam forming on the original transmission signal x; and a transmitting module, which is configured to: transmit the beam formed transmission signal via the channel matrix H.

The geometric mean decomposition module is configured to execute GMD on the channel matrix H according to the following way: executing the geometric mean decomposition H=QRP$^{-1}$ on the channel matrix H, where Q and P are unitary matrixes, the superscript −1 is the conjugate transpose operator, that is, it satisfies the $Q^{-1}Q=P^{-1}P=I_{K_1,K_2}$, where I is the unit matrix, the subscripts $K_1$ and $K_2$ respectively denote the numbers of rows and columns of the matrix, $K_1=K_2=K$, where K is the rank of the channel matrix H, R is an upper triangular matrix with the same diagonal elements, and its diagonal elements are:

$$a_{ii} = \bar{\lambda} = \left(\prod_{i=1}^{K} \lambda_i\right)^{1/K},$$

$\lambda_1 \ge \lambda_2 \ge \ldots \lambda_K \ge 0$, is a nonzero eigenvalue of the correlation matrix HH$^{-1}$, i is an integer, and $1 \le i \le K$;

the beam forming processing module is configured to execute multi-beam forming processing on the original transmission signal x according to the following way: taking the unitary matrix P as the weight matrix to estimate the transmission weight $W_{GMD}$, v, and executing multi-beam forming processing on the original transmission signal x according to the estimated transmission weight to obtain the beam formed transmission signal $W_{GMD}$·x, where $$x = \begin{bmatrix} x_1 \\ \vdots \\ x_i \\ \vdots \\ x_K \end{bmatrix}, \text{ and } \begin{bmatrix} x_1 \\ \vdots \\ x_i \\ \vdots \\ x_K \end{bmatrix}$$

is the original transmission signal sequence.

The transmitting module is configured to transmit the beam formed transmission signal $W_{GMD}$·x via the channel matrix H, wherein the transmitted signal s is: s=H·$W_{GMD}$·x.

The example of the present invention also provides a receiving device for supporting multi-beam forming based on the joint receiving and transmitting end information, and the receiving device comprises:

a receiving module, which is configured to: receive the signal r, r=H·$W_{GMD}$·x+n, where n is the noise; wherein H is the channel matrix, x is the original transmission signal, $W_{GMD}$ is the transmission weight, $W_{GMD}$=P; P is the unitary matrix, the channel matrix H is executed by the geometric mean decomposition H=QRP$^{-1}$, where Q is a unitary matrix; the superscript −1 is the conjugate transpose operator, that is, it satisfies the $Q^{-1}Q=_P{}^{-1}P=I_{K_1,K_2}$, where I is the unit matrix, the subscripts $K_1$ and $K_2$ respectively denote the numbers of rows and columns of the matrix, $K_1=K_2=K$, where K is the rank of the channel matrix H, R is an upper triangular matrix with the same diagonal elements, and its diagonal elements are:

$$a_{ii} = \bar{\lambda} = \left(\prod_{i=1}^{K} \lambda_i\right)^{1/K},$$

$\lambda_1 \ge \lambda_2 \ge \ldots \ge \lambda_K \ge 0$, $\lambda_i$ is a nonzero eigenvalue of the correlation matrix HH$^{-1}$, i is an integer, and $1 \le i \le K$;

an equalization processing module, which is configured to: use the unitary matrix $Q^{-1}$ to equalize the received signal r to acquire the equalized received signal $$\tilde{r} = \begin{bmatrix} \tilde{r}_1 \\ \vdots \\ \tilde{r}_i \\ \vdots \\ \tilde{r}_K \end{bmatrix}, \text{ where } \begin{bmatrix} \tilde{r}_1 \\ \vdots \\ \tilde{r}_i \\ \vdots \\ \tilde{r}_K \end{bmatrix}$$

is the equalized received signal sequence, and decompose H into K identical sub channels, and the signal received on each sub channel after the equalization is $$\tilde{r}_i = \bar{\lambda} x_i + \sum_{j>i}^{K} a_{ij} x_j + \tilde{n}_i,$$

where j is an integer, $1 \leq j \leq K$, $a_{ij}$ is an element in the upper triangular matrix of the geometric mean decomposition, $x_i$ is the $i^{th}$ original transmission signal in the original transmission signal sequence, $x_j$ is the $j^{th}$ original transmission signal in the original transmission signal sequence, and $\tilde{n}_i$ is the $i^{th}$ noise in the noise sequence after the equalization processing; and a signal recovering module, which is configured to: recover the transmission signal x according to the equalized received signal.

The signal recovering module is configured to use the successive interference cancellation technology to recover the transmission signal $$x = \begin{bmatrix} x_1 \\ \vdots \\ x_i \\ \vdots \\ x_K \end{bmatrix}.$$

It can be understood by the person having ordinary skill in the art that all or parts of steps in the abovementioned method can be fulfilled by instructing the relevant hardware with a program, and said program can be stored in a computer readable storage medium such as the read only memory, the magnetic disk or the optical disk and so on. Optionally, all or parts of steps in the abovementioned examples can also be implemented with one or more integrated circuits. Correspondingly, each module/unit in the abovementioned examples can be implemented in the form of hardware or in the form of software function modules. The present invention is not limited to any specific combination forms of the hardware and software.

Obviously, the person skilled in the art can make various modifications and transformations on the present invention without departing from the spirit and scope of the present invention. Thus, if these modification and transformations fall into the scope of the claims of the present invention or their equivalent techniques, the present invention also intends to include these modification and transformations.

INDUSTRIAL APPLICABILITY

The present invention executes the geometric mean decomposition on the channel matrix H to make the sub channels corresponding to various beam obtain the equal gain, and when the channel is an ill-conditioned channel, this channel equalization will not interfere with searching the perturbation vector, so as to avoid performance degradation.

What is claimed is:

1. A method for multi-beam forming based on joint receiving and transmitting end information, and the method comprises:

a transmitting end executing geometric mean decomposition (GMD) on a channel matrix H to obtain a unitary matrix P; and the transmitting end taking the unitary matrix P as a weight matrix of GMD beam forming, and executing multi-beam forming processing on an original transmission signal x; wherein:

the step of the transmitting end executing the GMD on the channel matrix H comprises: the transmitting end executing geometric mean decomposition on the channel matrix H: $H=QRP^{-1}$, where Q and P are unitary matrixes, a superscript $-1$ is a conjugate transpose operator, that is, satisfying $Q^{-1}Q=P^{-1}P=I_{K_1,K_2}$, where I is a unit matrix, subscripts $K_1$ and $K_2$ respectively denote numbers of rows and columns of a matrix, $K_1=K_2$ $K=$, where K is a rank of the channel matrix H, R is an upper triangular matrix with same diagonal elements, and the diagonal elements of the upper triangular matrix are:

$$a_{ii} = \bar{\lambda} = \left( \prod_{i=1}^{K} \lambda_i \right)^{1/K},$$

$\lambda_1 \geq \mu_2 \geq \ldots \geq \lambda_K \geq 0$, $\lambda_i$ is a nonzero eigenvalue of a correlation matrix $HH^{-1}$, i is an integer, and $1 \leq i \leq K$;

the step of executing multi-beam forming processing on the original transmission signal x comprises: the transmitting end taking the unitary matrix P as the weight matrix to estimate a transmission weight value $W_{GMD}$, $W_{GMD}=P$, and executing multi-beam forming processing on the original transmission signal x according to the estimated transmission weight $W_{GMD}$ to acquire a beam formed transmission signal $W_{GMD} \cdot x$, where $$x = \begin{bmatrix} x_1 \\ \vdots \\ x_i \\ \vdots \\ x_K \end{bmatrix}, \text{ and } \begin{bmatrix} x_1 \\ \vdots \\ x_i \\ \vdots \\ x_K \end{bmatrix}$$

is an original transmission signal sequence.

2. The method of claim 1, after the step of executing multi-beam forming processing on the original transmission signal x, the method further comprising:

the transmitting end transmitting the beam formed transmission signal $W_{GMD} \cdot x$ via the channel matrix H, wherein a transmitted signal s is: $s = H \, W_{GMD} \, x$.

3. The method of claim 2, after the step of the transmitting end transmitting the beam formed transmission signal $W_{GMD} \cdot x$ via the channel matrix H, the method further comprising:

a receiving end receiving a signal r, $r=H \cdot W_{GMD} \cdot x+n$, where n is a noise;

the receiving end using a unitary matrix $Q^{-1}$ to equalize the received signal r to acquire an equalized received signal $$\tilde{r} = \begin{bmatrix} \tilde{r}_1 \\ \vdots \\ \tilde{r}_i \\ \vdots \\ \tilde{r}_K \end{bmatrix}, \begin{bmatrix} \tilde{r}_1 \\ \vdots \\ \tilde{r}_i \\ \vdots \\ \tilde{r}_K \end{bmatrix}$$

being an equalized received signal sequence, and decomposing H into K identical sub channels, and the equalized received signal on each sub channel is $$\tilde{r}_i = \overline{\lambda} x_i + \sum_{j>i}^{K} a_{ij} x_j + \tilde{n}_i,$$

where j is an integer, $1 \le j \le K$, $a_{ij}$ is an element in the upper triangular matrix of the geometric mean decomposition, $x_i$ is an $i^{th}$ original transmission signal in the original transmission signal sequence, $x_j$ is a $j^{th}$ original transmission signal in the original transmission signal sequence, and $\tilde{n}_i$ is an $i^{th}$ noise in a noise sequence after equalization processing; and recovering the transmission signal x according to the equalized received signal.

4. The method of claim 3, wherein, in the step of recovering the transmission signal x according to the equalized received signal, a successive interference cancellation technique is used to recover the transmission signal $$x = \begin{bmatrix} x_1 \\ \vdots \\ x_i \\ \vdots \\ x_K \end{bmatrix}.$$

5. A transmitting device for supporting multi-beam forming based on joint receiving and transmitting end information, which comprises:

a geometric mean decomposition module, which is configured to: execute geometric mean decomposition (GMD) on a channel matrix H to obtain a unitary matrix P;

a beam forming processing module, which is configured to: take the unitary matrix P as a weight matrix of GMD beam forming, and execute multi-beam forming processing on an original transmission signal x; and a transmitting module, which is configured to: transmit a beam formed transmission signal via the channel matrix H; wherein:

the geometric mean decomposition module is configured to execute GMD on the channel matrix H according to a following way: executing the geometric mean decomposition on the channel matrix H: $H = QRP^{-1}$, where Q and P are unitary matrixes, a superscript $-1$ is a conjugate transpose operator, that is, satisfying $Q^{-1}Q = P^{-1}P = I_{K_1,K_2}$, where I is a unit matrix, subscripts $K_1$ and $K_2$ respectively denote numbers of rows and columns of a matrix, $K_1 = K_2$ $K=$, where K is a rank of the channel matrix H, R is an upper triangular matrix with same diagonal elements, and the diagonal elements of the upper triangular matrix are:

$$a_{ii} = \overline{\lambda} = \left( \prod_{i=1}^{K} \lambda_i \right)^{1/K},$$

$\lambda_1 \ge \lambda_2 \ge \ldots \ge \lambda_K \ge 0$, $\lambda_i$ is a nonzero eigenvalue of a correlation matrix $HH^{-1}$, i is an integer, and $1 \le i \le K$;

the beam forming processing module is configured to execute multi-beam forming processing on the original transmission signal according to a following way: taking the unitary matrix P as the weight matrix to estimate a transmission weight $W_{GMD}$, $W_{GMD} = P$, and executing multi-beam forming processing on the original transmission signal x according to the estimated transmission weight $W_{GMD}$ to acquire a beam formed transmission signal $W_{GMD} \cdot x$, where $$x = \begin{bmatrix} x_1 \\ \vdots \\ x_i \\ \vdots \\ x_K \end{bmatrix}, \text{ and } \begin{bmatrix} x_1 \\ \vdots \\ x_i \\ \vdots \\ x_K \end{bmatrix}$$

is an original transmission signal sequence.

6. The transmitting device of claim 5, wherein:

the transmitting module is configured to transmit the beam formed transmission signal $W_{GMD} \cdot x$ via the channel matrix H, wherein a transmitted signal s is: $s = H W_{GMD} x$.

7. A receiving device for supporting multi-beam forming based on joint receiving and transmitting end information, which comprises:

a receiving module, which is configured to: receive a signal r, $r = H \cdot W_{GMD} \cdot x + n$, where n is a noise; wherein H is a channel matrix, x is an original transmission signal, $W_{GMD}$ is a transmission weight, $W_{GMD} = P$; P is a unitary matrix, geometric mean decomposition is executed on the channel matrix H: $H = QRP^{-1}$, where Q is the unitary matrix; a superscript $-1$ is a conjugate transpose operator, that is, satisfying $Q^{-1}Q = P^{-1}P = I_{K_1,K_2}$, where I is a unit matrix, the subscripts $K_1$ and $K_2$ respectively denote numbers of rows and columns of a matrix, $K_1 = K_2$ $K=$, where K is a rank of the channel matrix H, R is an upper triangular matrix with same diagonal elements, and the diagonal elements of the upper triangular matrix are:

$$a_{ii} = \overline{\lambda} = \left( \prod_{i=1}^{K} \lambda_i \right)^{1/K},$$

$\lambda_1 \ge \lambda_2 \ge \ldots \ge \lambda_K \ge 0$, $\lambda_i$ is a nonzero eigenvalue of a correlation matrix $HH^{-1}$, i is an integer, and $1 \le i \le K$;

an equalization processing module, which is configured to: use a unitary matrix $Q^{-1}$ to equalize the received signal r to acquire an equalized received signal $$\tilde{r} = \begin{bmatrix} \tilde{r}_1 \\ \vdots \\ \tilde{r}_i \\ \vdots \\ \tilde{r}_K \end{bmatrix}, \begin{bmatrix} \tilde{r}_1 \\ \vdots \\ \tilde{r}_i \\ \vdots \\ \tilde{r}_K \end{bmatrix}$$

is an equalized received signal sequence, decompose H into K identical sub channels, and the equalized received signal on each sub-channel is $$\tilde{r}_i = \overline{\lambda} x_i + \sum_{j>i}^{K} a_{ij} x_j + \tilde{n}_i,$$

$\tilde{n}_i$, where j is an integer, $1 \leq j \leq K$, $a_{ij}$ is an element in the upper triangular matrix of the geometric mean decomposition, $x_i$ is an $i^{th}$ original transmission signal in the original transmission signal sequence, $x_j$ is a $i^{th}$ original transmission signal in the original transmission signal sequence, and $\tilde{n}_i$ is an $i^{th}$ noise in a noise sequence after equalization processing; and a signal recovering module, which is configured to: recover the transmission signal x according to the equalized received signal.

8. The receiving device of claim 7, wherein, the signal recovering module is configured to use a successive interference cancellation technique to recover the transmission signal $$x = \begin{bmatrix} x_1 \\ \vdots \\ x_i \\ \vdots \\ x_K \end{bmatrix}.$$

\* \* \* \* \*